(12) United States Patent
Yabe

(10) Patent No.: US 6,600,281 B2
(45) Date of Patent: Jul. 29, 2003

(54) WIPER CONTROL DEVICE

(75) Inventor: Hiroo Yabe, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/954,023

(22) Filed: Sep. 18, 2001

(65) Prior Publication Data

US 2002/0033685 A1 Mar. 21, 2002

(30) Foreign Application Priority Data

Sep. 19, 2000 (JP) .......................... 2000-283155

(51) Int. Cl.[7] .................................. H02P 1/04
(52) U.S. Cl. ...................... 318/443; 318/445; 318/446; 318/282; 318/286; 318/DIG. 2; 318/268; 15/250.001; 15/250.12
(58) Field of Search ................. 318/444, 443, 318/445, 446, 466, 468, 266, 268, 269, 282, 283, 286, DIG. 2; 15/250.001, 250.12, 250.13, 250.16, 250.17

(56) References Cited

U.S. PATENT DOCUMENTS

| | | | |
|---|---|---|---|
| 3,919,613 A | * 11/1975 | Steinmann | 318/443 |
| 4,431,954 A | * 2/1984 | Carpenter et al. | 318/443 |
| 4,731,566 A | * 3/1988 | Takaishi | 318/444 |
| 5,252,897 A | * 10/1993 | Porter et al. | 318/443 |
| 5,786,676 A | * 7/1998 | Ogawa et al. | 318/468 |
| 6,400,110 B1 | * 6/2002 | Yabe et al. | 318/443 |

FOREIGN PATENT DOCUMENTS

JP          5-58250          3/1993

OTHER PUBLICATIONS

English translation of the detailed description of Japanese Patent No. 5–058250 (pp 1–3), [retrieved on Oct. 8, 2002]. Retrieved from the Industrial Property Digital Library using internet <URL: http://http://www.ipdl.jpo.go.jp/homepg_e.ipdl °.*

* cited by examiner

Primary Examiner—Bentsu Ro
Assistant Examiner—Rina I. Duda
(74) Attorney, Agent, or Firm—Finnegan, Henderson, Farabow, Garrett & Dunner, L.L.P.

(57) ABSTRACT

The wiper control device comprises a wiper motor 52 for moving a wiper, a switch 53 for outputting a signal which inverts at each single sweep of the wiper, a wiper switch circuit 51 of a combination switch which instructs movement of the wiper, a first solid state switching element FET-b which drives the wiper motor, a controller 55 which turns the first solid state switching element on and off intermittently on the basis of the signal from the switch in a case in which intermittent wiper movement is instructed by the combination switch, a second solid state switching element FET-a2 which is connected in series to the first solid state switching element and is turned on by power source voltage, and a third solid state switching element FET-a1 which is connected in series to the second solid state switching element and is for braking the wiper motor.

8 Claims, 10 Drawing Sheets

WIPER CONTROL DEVICE

BACKGROUND OF THE INVENTION

The present invention relates to a wiper control device which controls a wiper for an automobile. Conventionally, a wiper control device in which a wiper motor is controlled by a solid state switching element is known. For example, a "wiper control device" which controls a wiper motor using two field effect transistors (FETs) is disclosed in Japanese Patent Application Laid-Open (JP-A) No. 5-58250. The structure of this wiper control device is shown in FIG. 1.

This wiper control device comprises a wiper motor 12 included in a wiper motor circuit 11, and a wiper switch circuit 17. When a high speed sweep mode (HI) is set, the wiper switch circuit 17 connects a power source +B to the high speed operation terminal of the wiper motor 12. When an intermittent sweep mode (INT) is selected, a FET drive circuit 20 in a control circuit 16, which operates in response to instructions from the wiper switch circuit 17, operates a first FET 21, and controls the wiper motor 12 so as to realize intermittent sweeping. When the high speed sweep mode is set, a current due to back electromotive force is outputted to the low speed operation terminal of the wiper motor 12. Then the flow of current into the first FET21 is prevented by diodes D1 and D2 for preventing reverse flow, and the first FET21 is prevented from breaking.

SUMMARY OF THE INVENTION

However, the wiper control device disclosed in the aforementioned publication has the following problems. Namely, when a second FET 22 is turned on and braking operation is carried out, a voltage drop arises due to a diode D3 which is inserted downstream (at the source side) of the second FET 22, and the braking efficiency deteriorates.

Further, if the first FET 21 is turned off in a state where the wiper motor 12 is locked, the extra large current which has flowed until then (the current differs in accordance with the wiper motor, but is on the order of 5 to 30A) is rapidly cut off. Therefore, a back electromotive force V (=−Ldi/dt) due to an inductance L of the wiper motor 12 arises, and is expressed as a surge. As the result, there is the possibility that the diode D3 inserted downstream of the second FET 22 and the first FET 21 will cause avalanche breakage.

Further, because the diodes D1 and D2 are inserted on the path of the main current from the plus terminal of a battery 14 via the first FET 21 to the wiper motor 12, a voltage drop arises and the driving voltage of the wiper motor 12 falls. During low speed rotation when the state of the wiper switch circuit 17 is the intermittent sweep mode (INT) and the low speed sweep mode (LO), the motor current always flows in the diodes D1 and D2, and much of heat in correspondence with the voltage drop at the two diodes D1 and D2 is generated, and therefore a heat dissipating plate, a blower mechanism, and the like are needed. Moreover, large-sized diodes D1 and D2 for electric power are needed in order to impart sufficient current capacity. In the similar way, the current supply to the wiper motor at the time of the low speed continuous operation is carried out by the first FET21, then the first FET21 must be made to have a current capacity and a heat dissipating ability such that the FET can withstand continuous current, and the device becomes larger.

The object of the present invention is to solve the various problems which were described above, and to provide a wiper control device in which a solid state switching element is used, which is compact and highly dependable, and in which movements are reliable.

A first aspect of the present invention provides a wiper control device which comprises a wiper motor for moving a wiper, a switch which outputs a signal which inverts at each single sweep of the wiper, a combination switch instructing movement of the wiper, a first solid state switching element which drives the wiper motor, a controller which turns the first solid state switching element on and off intermittently on the basis of the signal from the switch in a case in which intermittent wiper movement is instructed by the combination switch, and a second solid state switching element which is connected in series to the first solid state switching element and is turned on by the power source voltage.

In accordance with a second aspect of the present invention, there is provided a third solid state switching element, which is connected in series to the second solid state switching element and which is for braking the wiper motor, and the controller, after turning the first solid state switching element off, turns the third solid state switching element on, thereby forming a closed circuit which is for making reverse current flow to the wiper motor so as to brake the wiper motor.

In accordance with a third aspect of the present invention, in a case in which the signal from the switch is not switched for a predetermined time, the controller turns the first solid state switching element off.

In accordance with a fourth aspect of the present invention, the wiper motor further comprises a high speed operation terminal which is for rotating at high speed and a low speed operation terminal which is for rotating at low speed, and in a case in which high speed movement is instructed by the combination switch, the high speed operation terminal of the wiper motor is directly connected to the power source and driven, and in a case in which low speed movement is instructed by the combination switch, the low speed operation terminal of the wiper motor is directly connected to the power source and driven.

In accordance with a fifth aspect of the present invention, the wiper motor comprises one power source terminal which is for rotating at a predetermined speed, and in a case in which a rotation movement is instructed by the combination switch, the power source terminal of the wiper motor is directly connected to the power source and driven.

In accordance with a sixth aspect of the present invention, the first solid state switching element is provided between the wiper motor and a power source, or between the wiper motor and ground.

A seventh aspect of the present invention further comprises a second wiper motor which is for moving a second wiper, a second switch which outputs a signal which inverts at each single sweep of the second wiper, a second combination switch which instructs movement of the second wiper, and a relay which drives the second wiper motor, and the controller controls the relay in response to the instruction of the second combination switch and drives the second wiper motor.

DESCRIPTION OF THE PREFERRED EMBODIMENT

Figure 1:
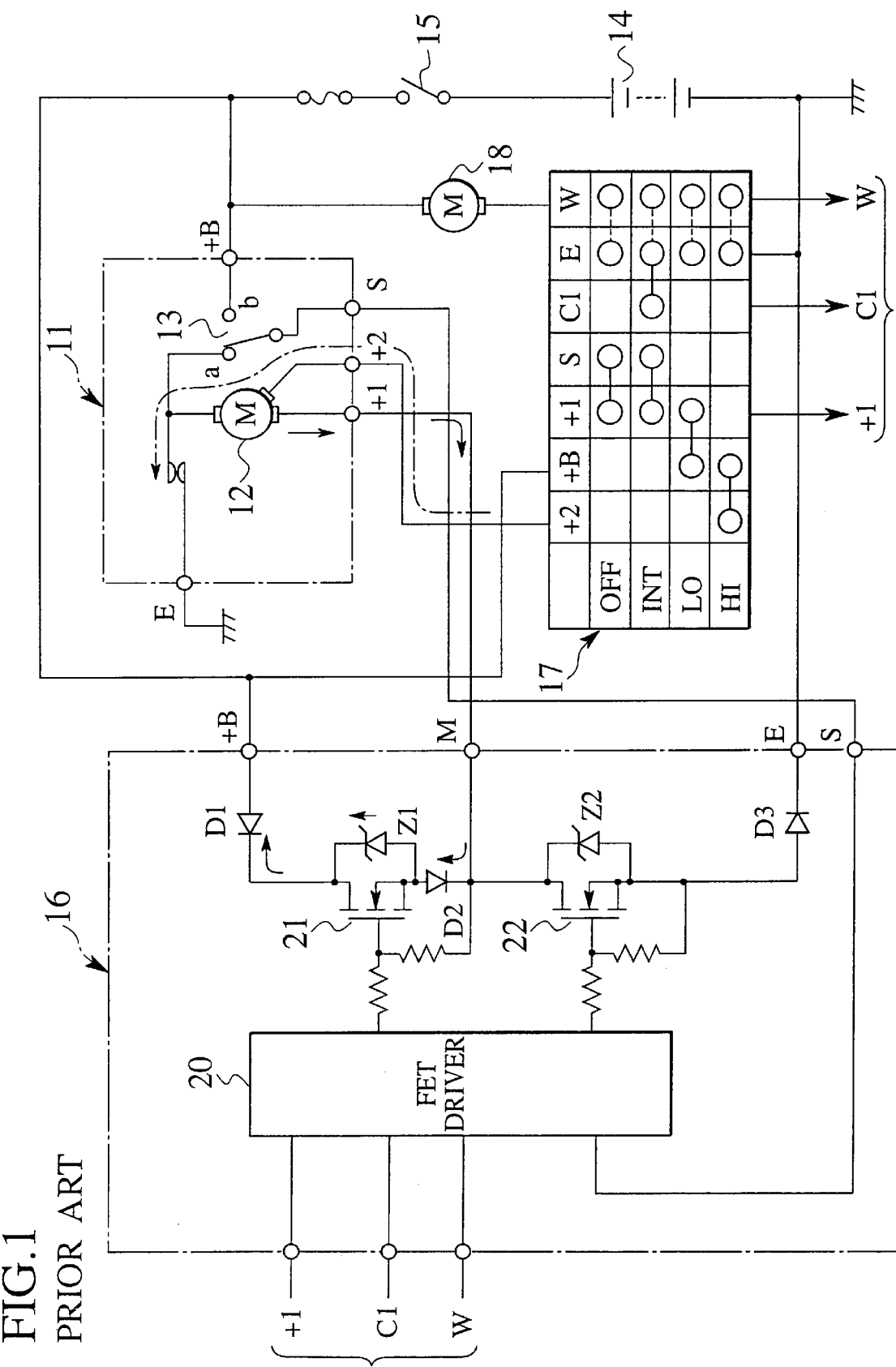
FIG. 1 is a diagram for explaining a conventional wiper control device.

There will be detailed below a wiper control device according to the preferred embodiments of the present invention with reference to the accompanying drawings. Like members are designated by like reference characters.

First Embodiment

Figure 2:
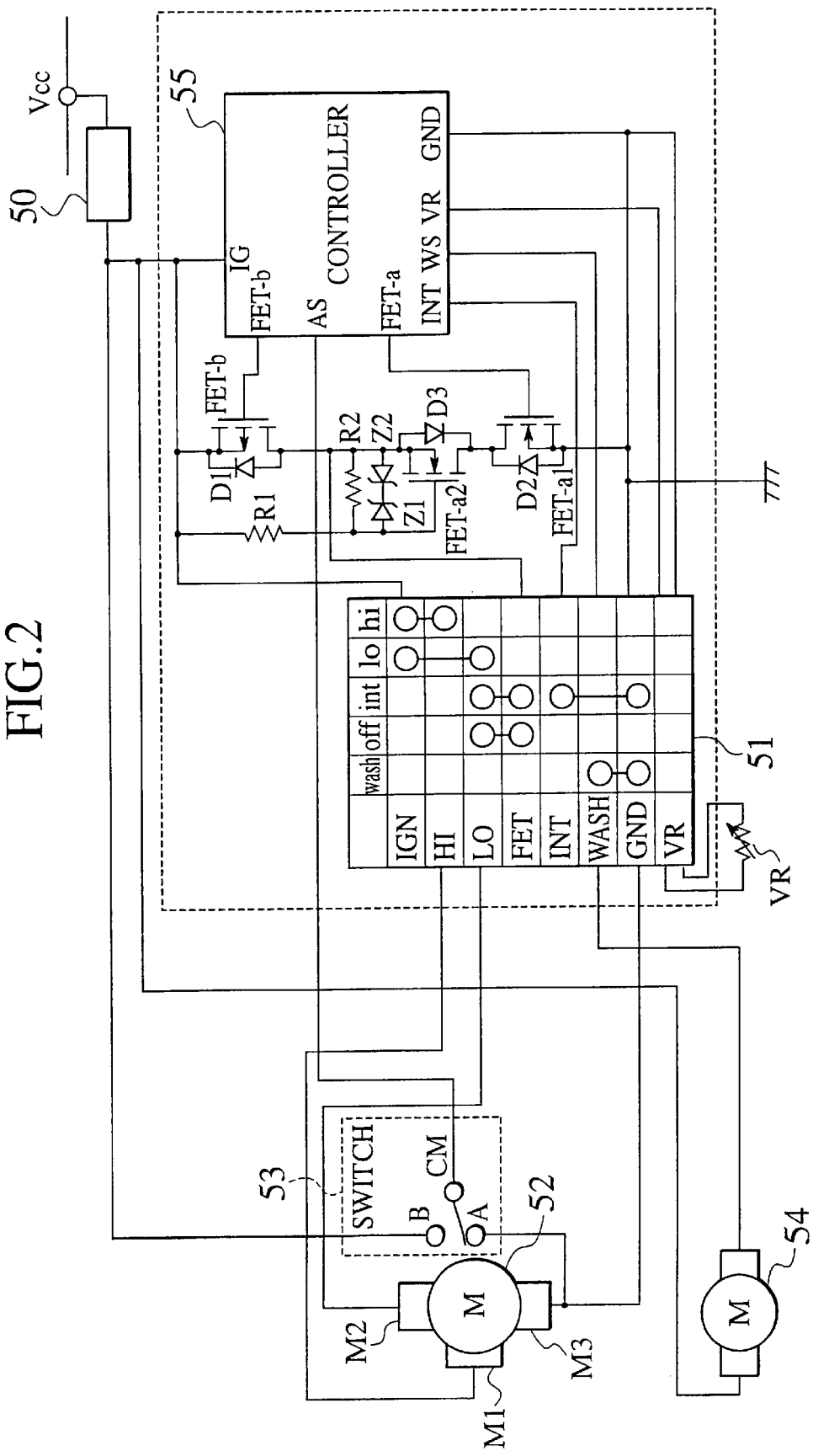
FIG. 2 is a block diagram showing the structure of a wiper control device according to a first embodiment of the present invention.

A wiper control device which relates to a first embodiment drives a two speed wiper motor by high side switch driving. FIG. 2 is a block diagram showing the structure of the wiper control device according to the first embodiment.

The wiper drive device is formed by a fuse 50, a wiper switch circuit 51, a wiper motor 52, a switch 53, a washer motor 54, a controller 55, a P-channel electric field effect transistor FET-b (hereinafter simply called "FET-b"), an N-channel electric field effect transistor FET-a1 (hereinafter simply called "FET-a1"), an N-channel electric field effect transistor FET-a2 (hereinafter simply called "FET-a2"), a resistor R1, a resistor R2, a Zener diode Z1, a Zener diode Z2, and a variable resistor VR.

The wiper control device is supplied with electric power from a battery via an ignition switch (both are not shown in the figures). Electric power is supplied to the respective sections of the wiper control device via the fuse 50. The electric power which is supplied to the respective sections is an IGN power source.

The wiper switch circuit 51 is a combination switch provided as a wiper operation element. The combination switch which is used in the wiper control device is used for setting any of five movement modes which are a high speed sweep mode (hi), a low speed sweep mode (lo), an intermittent sweep mode (int), an off mode (off), and a wash mode (wash). The wiper switch circuit 51 is equipped with an IGN terminal, a HI terminal, a LO terminal, a FET terminal, an INT terminal, a WASH terminal, a GND terminal, and a VR terminal set. The IGN terminal is connected to the IGN power source, and the GND terminal is grounded.

The wiper switch circuit 51 connects the respective terminals which are described above in correspondence with set movement modes. Namely, in the high speed sweep mode (hi), the IGN terminal and the HI terminal are connected. In the low speed sweep mode (lo), the IGN terminal and the LO terminal are connected. In the intermittent sweep mode (int), the LO terminal and the FET terminal are connected, and the INT terminal and the GND terminal are connected. In the off mode (off), the LO terminal and the FET terminal are connected. In the wash mode (wash), the WASH terminal and the GND terminal are connected.

The wiper motor 52 comprises a high speed operation terminal M1, a low speed operation terminal M2, and a common terminal M3. The high speed operation terminal M1 is connected to the HI terminal of the wiper switch circuit 51, and the low speed operation terminal M2 is connected to the LO terminal of the wiper switch circuit 51, and the common terminal M3 is connected to the GND terminal of the wiper switch circuit 51, respectively.

The switch 53 is switched every time that the wiper completes a single sweep. An input terminal B of the switch 53 is connected to the IGN power source, and an input terminal A is connected to the GND terminal of the wiper switch circuit 51. Further, a common terminal CM is connected to a terminal AS (which will be described later) of the controller 55. The common terminal CM of the switch 53 is usually connected to the input terminal A, and is switched each one sweep.

The washer motor 54 is used for discharging washer fluid. One terminal of the washer motor 54 is connected to the IGN power source, and another terminal is connected to the WASH terminal of the wiper switch circuit 51. The washer motor 54 operates by the WASH terminal being grounded when the wash mode (wash) is set by the wiper switch circuit 51.

Due to the variable resistor VR being operated in a case in which the wiper is moved in the intermittent sweep mode (int), the time interval of the wiper movement can be set to an arbitrary value. One terminal of the variable resistor VR is grounded, and another terminal thereof is connected to the VR terminal of the controller 55.

The FET-b corresponds to the first solid state switching element of the present invention. The FET-b is for wiper motor driving, and controls the electric power which is supplied to the wiper motor 52 in the intermittent sweep mode (int) and the off mode (off). The source of the FET-b is connected to the IGN power source, and the drain of the FET-b is connected to the FET terminal of the wiper switch circuit 51 respectively. A gate of the FET-b is a control terminal and is connected to the FET-b terminal of the controller 55.

A diode D1 is formed, at the time of manufacturing, between the source and the drain of the FET-b. On/off state of the FET-b is controlled by signals being supplied from the FET-b terminal of the controller 55, and the FET-b electrically connects the IGN power source to the low speed operation terminal M2 of the wiper motor 52 via the LO terminal of the wiper switch circuit 51.

When abnormal current flows through the transistor FET-b or the motor 52 caused by motor locking, then the FET-b is quickly turned off by the controller 55, and the abnormal current is cut off. Accordingly, a breakdown by excessive heat generation according to the abnormal current is avoided, there is no need to make the current rating large. As a result, the transistor FET-b can be made compact and low-cost, and accordingly, the wiper control device can be made compact and low-cost.

The transistor FET-a1 corresponds to the third solid state switching element of the present invention. The FET-a1 is operative for braking movement. The source of the FET-a1 is grounded, and the drain is connected to the drain of the FET-a2, and the gate of the FET-a1 is connected to the FET-a terminal of the controller 55. Further, a diode D2 is formed, at the time of manufacturing, between the source and the drain of the FET-a1. On/off state of FET-a1 is controlled in response to signals supplied from the FET-a terminal of the controller 55, and the FET-a1 thus controls the flow of the braking current at the time of motor stopping movement.

The transistor FET-a1 is structured so that only the braking current at the time of motor stopping movement flows therethrough. Because the braking current merely flows for a short time of several tens of milliseconds to several hundreds of milliseconds, the RDSon rating can be increased to 2 to 20 times that of the FET-b. As a result, the FET-a1 can be made compact and low-cost, and accordingly, the wiper control device can be made more compact and low-cost.

The FET-a2 corresponds to the second solid state switching element of the present invention. The FET-a2 is for impeding the current at the time of reverse connection of the battery and for absorbing surges at the time of motor locking. The source of the FET-a2 is connected to the drain of the FET-b, and the drain of the FET-a2 is connected to the drain of the FET-a1. The gate of the FET-a2 is connected to the IGN power source via the resistor R1, and is connected to the source of the FET-a2 via the resistor R2.

Further, a diode D3 is formed, at the time of manufacturing, between the source and the drain of the FET-a2.

In accordance with the structure described above, a voltage of the IGN power source divided at the potential dividing resistors R1 and R2 is always applied to the gate of the FET-a2. Further, the Zener diodes Z1 and Z2, which are connected in reverse series and are inserted between the gate and the source of the FET-a2, are used for protecting the gate of the FET-a2. When a withstand voltage of the gate and the ESD resistance are sufficient, the potential divider R1 and R2 and the Zener diodes Z1 and Z2 can be omitted.

The FET-a2 is selected so as to have a rated voltage in the range of "battery voltage<Vdss of FET-a2≦Vdss of FET-a1". Accordingly, a required current capacity is small thereby a required RDSon rating is small as the same level as that of FET-a1, and the FET-a2 can be made more compact than the FET-a1.

Figure 3:
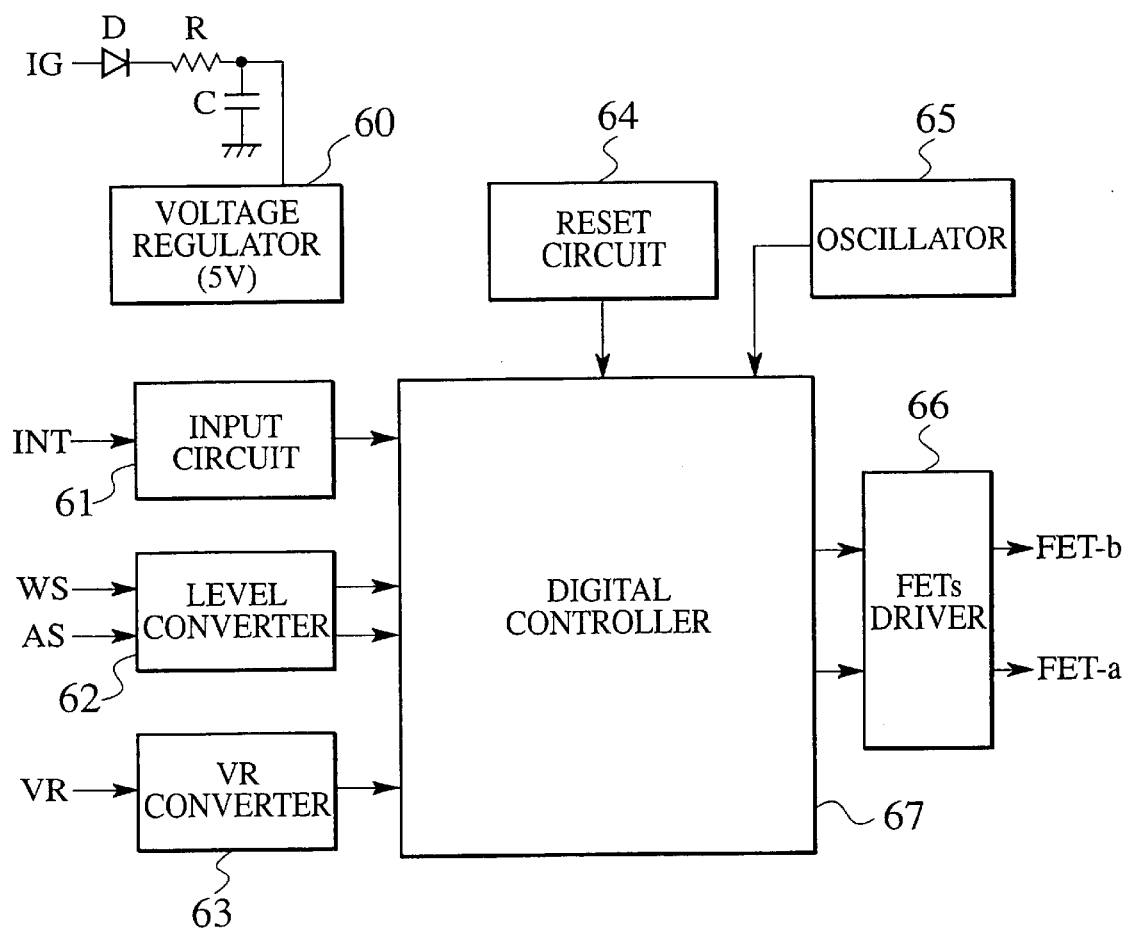
FIG. 3 is a block diagram showing the detailed structure of a controller of FIG. 2.

The controller 55 drives the gates of the FET-a1 and the FET-b to carry out intermittent wiper movement and post-washer wiping movement. The detailed structure of the controller 55 is shown in FIG. 3. The controller 55 is formed by a 5V regulator 60, an input circuit 61, a level shifter/converter 62, a VR converter 63, a reset circuit 64, an oscillator 65, a MOS-FET gate driver 66, and a digital controller 67.

The voltage regulator (5V) 60 is connected to the IGN power source via the IG terminal of the controller 55. Namely, the IGN power source which is supplied to the IG terminal is inputted via a filter which is formed by a diode D and a resistor R and a capacitor C, and electric power of 5V is generated. The electric power of 5V generated at the 5V regulator 60 is supplied to the digital controller 67.

The input circuit 61 is connected to the INT terminal of the wiper switch circuit 51 via the INT terminal of the controller 55. The input circuit 61 detects the on/off state of the contact of the wiper switch circuit 51 due to the current for detection flowing to the INT terminal of the wiper switch circuit 51, and detects whether or not the intermittent sweep mode (INT) is set.

The level shifter 62 is connected to the WASH of the wiper switch circuit 51 via the WS terminal of the controller 55, and is connected to the common terminal CM of the switch 53 via the AS terminal. The level shifter 62 converts the signal having battery voltage (Typ. 13.5V), which is inputted from the WS terminal and the AS terminal, to a logic level (5V), and supplies it to the digital controller 67.

The VR converter 63 is connected to the VR terminal of the wiper switch circuit 51 via the VR terminal of the controller 55. The VR converter 63 converts A signal representing the time interval of the wiper movement is sent from the VR terminal set of the wiper switch circuit 51 to the VR converter 63, and the signal is converted to a 5V level signal by the VR converter 63 and then the converted signal is supplied to the digital controller 67.

The reset circuit 64 initializes the digital controller 67 when the IGN power source is supplied to the IG terminal. The oscillator 65 generates a clock which is for operating the digital controller 67. The MOS-FET gate driver 66 converts the signal being generated at the digital controller 67 such that the signal matches the operation level of the MOS-FETs, and outputs the signals from the FET-a terminal and the FET-b terminal.

By processing the signals from the input circuit 61, the level converter 62, and the VR converter 63, the digital controller 67 generates signals which are supplied to the gates of the FET-a1 and the FET-b. The controller 55 has the following functions.
(I) A function of sending the operation signals with a time difference td between the FET-a1 and the FET-b.
(II) A function of keeping outputting the activating signals to the FET-b until the wiper returns to the park position when the combination switch is turned off or the like while the wiper is moving.
(III) A function of precisely stipulating the number of post-wiping movements after setting washing by the combination switch.
(IV) A function of precisely stipulating the number of post-wiping movements even if the combination switch is switched from on to off at the time of post-wiping after setting washing by the combination switch.
(V) A function of restoring to the original state after, at the time of an abnormality of the wiper motor 52, cutting off the output and then the abnormality being cancelled.

It should be noted that, in a conventional wiper control device, a current is supplied from a driving FET to a wiper motor also at the time of continuous low speed sweeping. In the wiper control device according to the present invention, the current is supplied from the FET-b to the low speed operation terminal M2 of the wiper motor 52 only during intermittent sweeping operation and during post-washer wiping movement operation.

Figure 4:
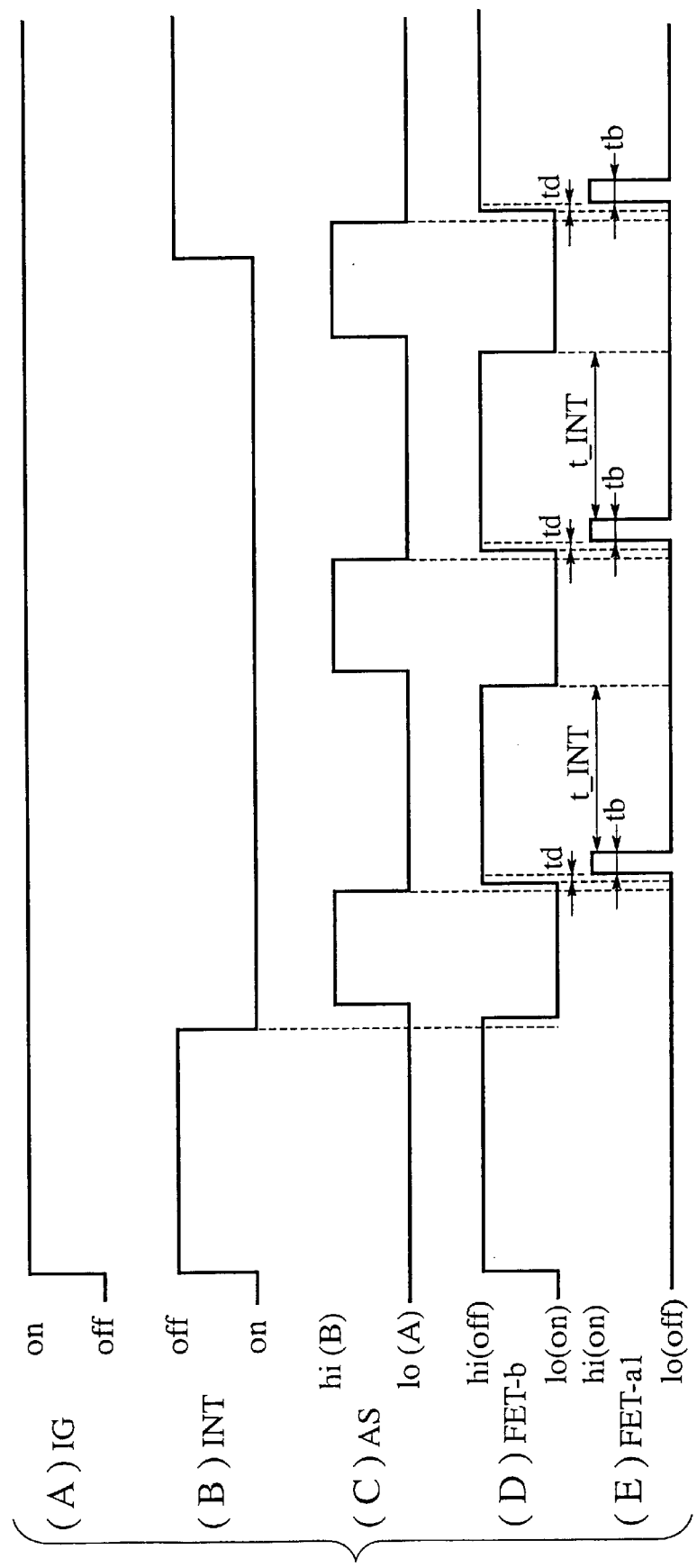
FIG. 4 is a timing chart showing intermittent movement of the wiper control device according to the first embodiment of the present invention.
Figure 5:
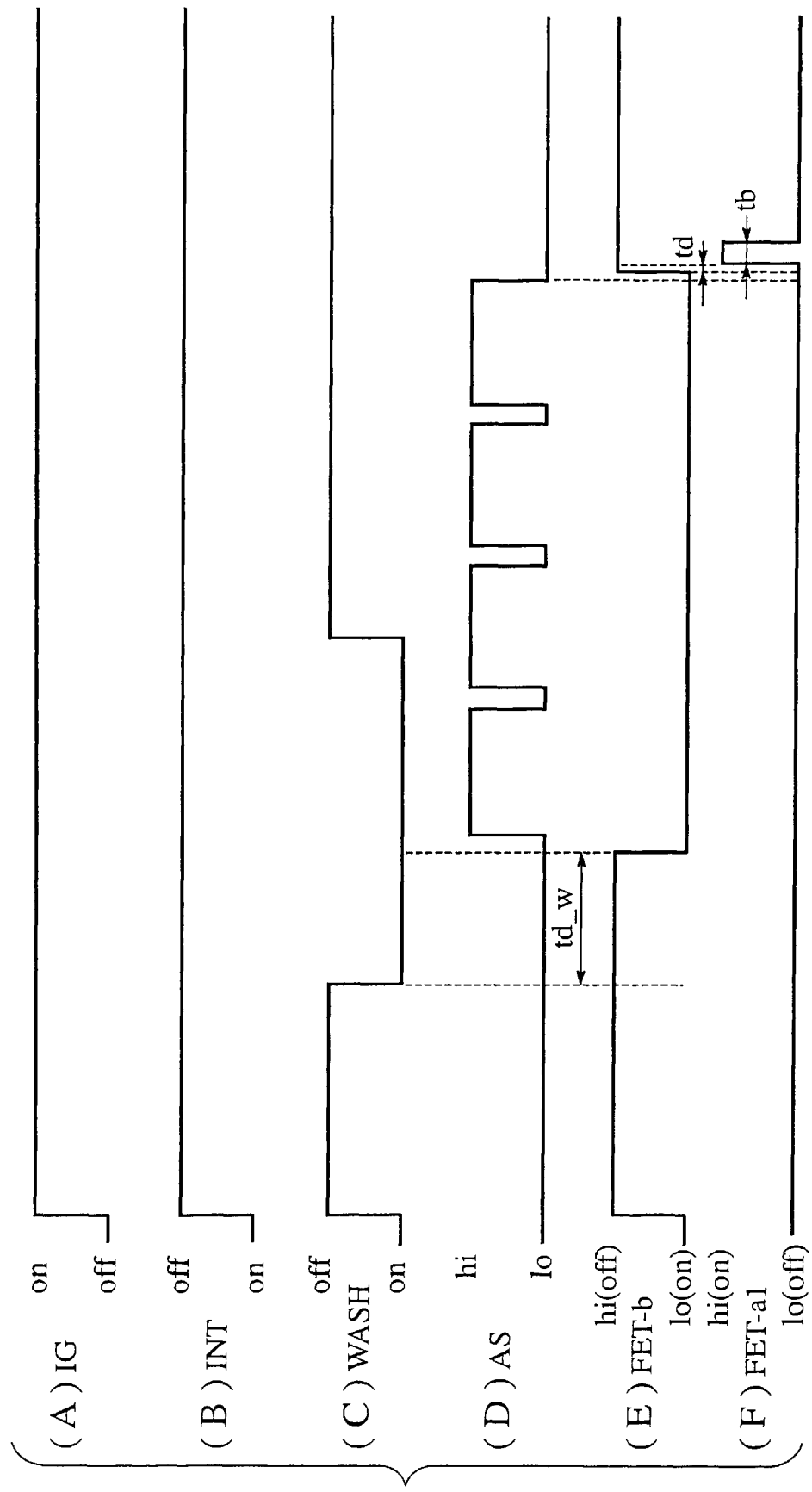
FIG. 5 is a timing chart showing washing movements of the wiper control device according to the first embodiment of the present invention.

Next, the movements of the wiper control device which is structured as described above will be described separately for movements at normal times and movements at abnormal times.
1. Movements in Normal Times
(i) Intermittent Wiper Movement First, the intermittent wiper movement at normal times will be described with reference to the block diagram which is shown in FIG. 3 and the timing chart as shown in FIG. 4.

Due to the ignition switch, which is not shown in the figures, being turned on, the state where the IGN power source is supplied is set as shown in FIG. 4(A). In this initial state, the wiper usually exists at the park position, and the common terminal CM of the switch 53, which operates in response to movement of the wiper motor 52, is connected to the input terminal A side. Accordingly, the signal from the common terminal CM of the switch 53 is low level (hereinafter, "L level") as shown in FIG. 4(C).

Further, the signal outputted from the FET-b terminal of the controller 55 is initially high level (hereinafter, "H level") as shown in FIG. 4(D), and the FET-b is in off state. Further, the signal outputted from the FET-a1 terminal of the controller 55 is initially L level as shown in FIG. 4(E), and the FET-a1 is in off state.

Because the FET-a1 is an N-channel type, when the H level is inputted to the gate, the FET-a1 is turned on (active), and the current flows between the drain and the source. When the L level is inputted to the gate, the FET-a1 is turned off. On the other hand, because the FET-b is a P-channel type, thereby when the L level is inputted to the gate, the FET-b is turned on, and when the H level is inputted to the gate, the FET-b is turned off. The H level and the L level signals are sufficiently higher and lower than the threshold operation voltage of the MOS-FET respectively.

When the mode becomes the intermittent sweeping mode (int) due to the combination switch being set at the INT position, as shown in FIG. 4(B), the signal inputted to the INT terminal of the controller 55 changes to L level. In response to this fall, the controller 55 immediately outputs an L level signal from the FET-b terminal, and supplies the L level signal to the gate of the FET-b. Accordingly, the FET-b is turned on, and the current flows through the route of "the IGN power source→the FET-b→the FET terminal of the wiper switch circuit 51→the LO terminal of the wiper switch circuit 51→the wiper motor 52→ground", and the wiper motor 52 starts rotating movement.

When a single sweep of the wiper is completed due to the rotation of the wiper motor 52, the switch 53, which operates synchronously with the rotation of the wiper motor 52, switches from the input terminal A side to the input terminal B side. Accordingly, the signal which is supplied from the common terminal CM of the switch 53 the terminal AS of the controller 55 changes to H level as shown in FIG. 4(C).

In this state, when the wiper motor 52 continues rotating and the wiper moves back-and-forth one time on the windshield glass, the wiper returns to the park position. At this time, the common terminal CM of the switch 53 returns so as to be connected to the input terminal A, and the L level is again inputted to the terminal AS of the controller 55.

When the L level is again inputted to the AS terminal of the controller 55, the controller 55 immediately outputs the H level signal from the FET-b terminal, and supplies the H level signal to the gate of the FET-b. Accordingly, the FET-b is turned off. Further, the controller 55 outputs the H level signal from the FET-a1 during an interval tb after the time td, and supplies the H level signal to the gate of the FET-a1. Accordingly, the FET-a1 is turned on (active) during the interval tb. The time td is set to prevent pass-through current from flowing due to the FET-b and FET-a1 being on state simultaneously, and may be set to be a sufficiently longer time than the response time of the MOS-FETs.

At this time, the wiper motor 52, attempts to continue rotating according to its inertia, but because the FET-a1 is turned on, the closed circuit of "the low speed operation terminal M2 of the wiper motor 52→the terminal LO of the wiper switch circuit 51→the FET terminal of the wiper switch circuit 51→the FET-a2→the FET-a1→the common terminal M3 of the wiper motor 52" is formed. Therefore, the reverse current (which is also called "braking current") flows rapidly and electric power is consumed. Thus, this becomes a load, and the wiper motor 52 stops suddenly, and the wiper stops without going over the park position.

The voltage, which is appropriately divided from the IGN voltage, is always applied to the gate of the FET-a2, thereby during the time of the FET-b being in off state, or during the time when the source voltage of the FET-a2 is lower than the gate voltage thereof by an amount which is greater than or equal to the operational threshold voltage of the FET-a2, the FET-a2 maintains on state. Therefore, the voltage drop in the related driving circuit caused by the braking current flowing therethrough is smaller than the voltage drop through the diode in the conventional wiper control device, and the electric power loss is smaller the conventional device.

The controller 55 counts the time t_INT which is set by the variable resistor VR from the time point when the FET-a is turned off, and thereafter, repeats the aforementioned operations. In this way, the intermittent wiper movement is carried out.

When the combination switch is set in the off mode (off) via the combination switch being switched from the INT position to the OFF position, an L level signal is inputted to the terminal INT of the controller 55. At this time, if the wiper is on the windshield glass and the signal inputted to the terminal AS is H level, the controller 55 maintains the signal outputted from the FET-b terminal at L level as is.

When the wiper motor 52 continues rotating, and the wiper returns to the park position, and the L level signal is inputted to the terminal AS, the controller 55 outputs an H level signal from the FET-b terminal, and thereafter, outputs the H level signal from the FET-a1, and stops the rotation of the wiper motor 52. Namely, when the combination switch is set in the off mode (off) via the combination switch being switched from the INT position to the OFF position, if the signal provided from the terminal AS is L level, the controller 55 immediately shifts to the braking operation as described above. In this way, regardless of the rotational position of the wiper at the time when the combination switch is turned off, the wiper definitely stops at the park position as long as the ignition switch is on.

(ii) Continuous Wiper Movement (Low Speed Operation)

When the combination switch is switched from the INT position to the LO position, the low speed operation terminal M2 of the wiper motor 52 is cut off from the drain of the FET-b and is connected to the IGN power source. Therefore, the current flows through the route of "the IGN power source→the IGN terminal of the wiper switch circuit 51→the LO terminal of the wiper switch circuit 51→the low speed operation terminal M2 of the wiper motor 52→ground", and the wiper motor 52 rotates continuously at low speed.

(iii) Continuous Wiper Movement (High Speed Operation)

When the combination switch is switched from the INT position to the HI position, the low speed operation terminal M2 of the wiper motor 52 is cut off from the drain of the FET-b, and the high speed operation terminal M1 is connected to the IGN power source. Therefore, the current flows through the route of "the IGN power source→the IGN terminal of the wiper switch circuit 51→the HI terminal of the wiper switch circuit 51→the high speed operation terminal M1 of the wiper motor 52→ground", and the wiper motor 52 rotates continuously at high speed. At this point, the low speed operation terminal M2 of the wiper motor 52 is cut off from the drain of the FET-b due to the operation by the combination switch, and back electromotive force is never applied to the FET-b.

(iv) Post-Washer Wiping Movement

The post-washer wiping movement will be described with reference to the timing chart as shown in FIG. 4. When the combination switch is at the OFF position or the INT position, as shown in FIG. 4(C), if the L level signal is inputted from the terminal WASH of the wiper switch circuit 51 to the terminal WS of the controller 55 by the operation of the wash mode, the controller 55 sets the signal outputted from the FET-b terminal of the controller 55 to the L level (on state) until the signal changing from H level to L level is inputted from the terminal AS repeatedly by a prescribed number of times.

Accordingly, the wiper motor 52 continues rotating and the wiper continues to move until sweeping of a prescribed number of times is completed. Further, the washer motor 54 continues rotating during the interval of the L level (on) as shown in FIG. 4(C), and pumps and discharges the washer fluid. Further, according to completion of the wiper scanning by the prescribed number of times, the controller 55 turns the signal outputted from the FET-b terminal to the H level (off state). The movement thereafter is the same as that of the intermittent wiper movement which was described above. It should be noted that the timing chart shown in FIG. 4 is an example of a case in which the signal INT is off.

2. Movements in Abnormal Operation (i) Motor Locking

When the combination switch is switched from the OFF position to the INT position or the LO position, the controller 55 turns the FET-b on by outputting an L level signal from the FET-b terminal, and starts to supply electricity to the wiper motor 52. At this time, if the rotation of the wiper motor 52 is stopped forcibly by force from the outside or the like and a locked state arises, the wiper motor 52 becomes overloaded, and exceeded current flows continuously to the wiper motor 52.

In this case, the wiper motor 52 is not rotating, and the signal supplied from the switch 53 to the terminal AS of the controller 55 is L level or H level as is. The controller 55 counts the passage of time of the signal inputted to the terminal AS. If the signal to the terminal AS has not changed for a time which is sufficiently longer than the time usually required for the wiper to sweep back-and-forth once and return to the park position, an H level (off) signal is outputted from the FET-b terminal.

At this time, back electromotive force arises due to the inductance of the wiper motor 52. However; the FET-a2 is active, and the current is consumed through the route of "the common terminal M3 of the wiper motor 52→the built-in diode D2 of the FET-a1→→the FET-a2→the terminal FET of the wiper switch circuit 51→the terminal LO of the wiper switch circuit 51→the low speed operation terminal M2 of the wiper motor 52". Therefore, the surge voltage is absorbed, and a failure such as avalanche breakage or the like does not occur.

Thereafter, when the cause of locking is removed and the locked state is released, the output stopped state of the controller 55 is reset according to the position of the combination switch being changed, and the movement of the mode after switching is carried out.

(ii) Reverse Connection of the Battery

In a case in which the plus terminal and the minus terminal of the battery are reversely connected due to a mistake in connection by the user or the like, if the FET-a2 does not exist, the destructive large current flows through the built-in diode D2 of the FET-a1 and the built-in diode D1 of the FET-b.

In the above-described case, L level voltage is applied to the gate of the FET-a2, and the FET-a2 is turned off. As a result, in accordance with the set state of the combination switch, the current flows through the route of "the wiper motor 52→the wiper switch circuit 51→the FET-b". However, the current is limited because the wiper motor 52 becomes loaded, and the current does not exceed the normal movement current. Accordingly, the FET-a1 and the FET-b do not break even in such a case.

In accordance with the first embodiment which was described above, due to the withstand voltage of the FET-a2 being "the battery voltage<the Vdss of the FET-a2≦the Vdss of the FET-a1", the FET-a2 can be made compact. Additionally, the voltage drop at the time of braking movement is small, and the braking efficiency is good, and further the motor can be quickly stopped. Moreover, the wiper control device can be made compact. The circuit for controlling the gate of the FET-a2 is formed by only the resistors, then control by the controller is not needed, and the size of the circuit of the controller can be made small.

The surge voltage at the time of motor locking does not arise due to the FET-a2 being always active, and the reliability of the wiper control device can be improved.

The wiper motor is driven by the electric field effect transistor only at the time of intermittent movement and post-washer wiping movement. When the abnormal current continues to flow due to motor locking, the current is cut off and the electric field effect transistor is protected. Thus, there is no need to make the current rating of the electric field effect transistor large, and compactness and low costs can be accomplished. Furthermore, the reliability of the entire wiper control device including the drive circuit and the motor can be improved.

According to the contact of the combination switch being changed at the time of low speed continuous movement and at the time of high speed continuous movement, the electric field effect transistor and the wiper motor are cut off from each other, and the influence of the inductive electromotive force of the wiper motor can be avoided. Therefore, there is no need to add a protective element of the electric field effect transistor or the like.

Second Embodiment

Figure 6:
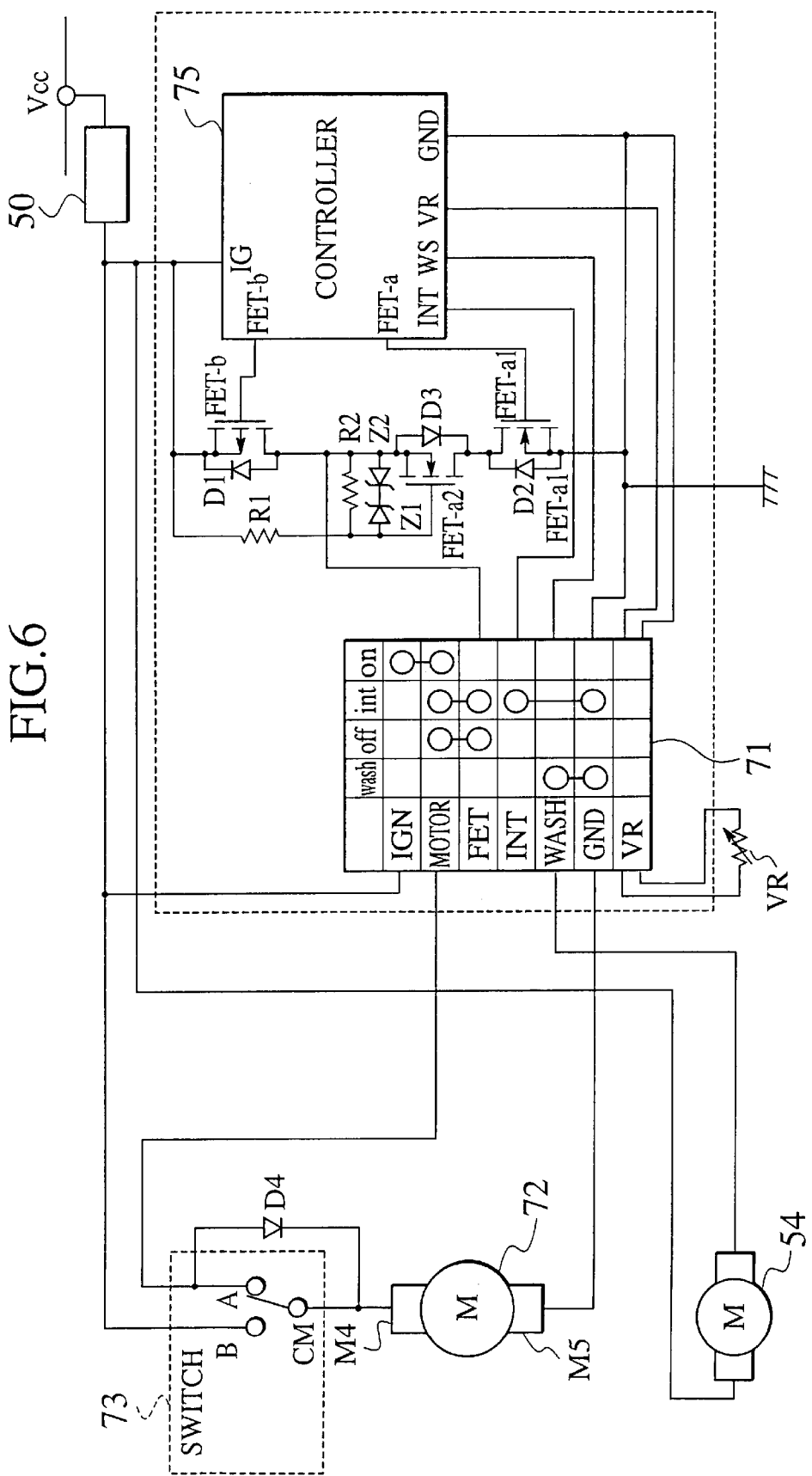
FIG. 6 is a block diagram showing the structure of a wiper control device according to a second embodiment of the present invention.

The wiper control device relating to the second embodiment drives a single speed wiper motor by high side switch driving. FIG. 6 is a block diagram showing the structure of the wiper control device relating to the second embodiment. The same reference numerals are applied to the same portions and corresponding portions of the wiper control device relating to the first embodiment.

A wiper switch circuit 71 is a combination switch circuit which is provided as a wiper operation element. The combination switch of this wiper control device is used for setting any of four movement modes which are the on mode (on), the intermittent mode (int), the off mode (off), and the wash mode (wash). The wiper switch circuit 71 is equipped with the IGN terminal, a MOTOR terminal, the FET terminal, an INT terminal, the WASH terminal, the GND terminal, and the VR terminal. The IGN terminal is connected to the IGN power source, and the GND terminal is grounded.

The wiper switch circuit 71 connects the respective terminals which are described above in correspondence with the set movement mode. Namely, in the on mode (on), the IGN terminal and the MOTOR terminal are connected to each other. In the intermittent mode (int), the MOTOR terminal and the FET terminal, and the INT terminal and the GND terminal are connected to each other. In the off mode (off), the MOTOR terminal and the FET terminal are connected to each other. In the wash mode (wash), the WASH terminal and the GND terminal are connected to each other.

A wiper motor 72 is equipped with a power source terminal M4 and a ground terminal M5. The power source terminal M4 is connected to a common terminal CM of a switch 73, and the ground terminal M5 is connected to the GND terminal of the wiper switch circuit 71.

The switch 73 is switched each time a single sweep of the wiper is completed. An input terminal A of the switch 73 is connected to the MOTOR terminal of the wiper switch circuit 71, and a input terminal B is connected to the IGN power source. The common terminal CM of the switch 73 is connected to the input terminal A in the park position, and is switched each single sweep. A diode D4 is provided between the input terminal A and the common terminal CM of the switch 73.

A controller 75 drives the gates of the FET-a1 and the FET-b to carry out the intermittent wiper movement and the post-washer wiping movement. The controller 75 is the same as the controller 55 which is used in the first embodiment, except that the terminal AS is not provided. Further, the structures except for the above-described structures are the same as those of the wiper control device relating to the first embodiment.

The wiper control device according to the second embodiment which is structured as described above operates as follows. In the intermittent wiper movement, the FET-b is set in on state from the start of rotation of the wiper motor 72 until the switch 73 moves to the input terminal B side. In this case, the current flows through the route of "the IGN terminal→the FET-b→the FET terminal of the wiper switch circuit 71→the MOTOR terminal of the wiper switch circuit 71→the switch 73→the wiper motor 72", and the wiper motor 72 operates.

Further, after the switch 73 moves to the input terminal B side, direct current flows from the IGN power source to the wiper motor 72. During the time when the contact moves from the input terminal A to the input terminal B, the current flows through the diode D4. The controller 75 effects control such that the FET-a1 is always in on state during the time of the FET-b being off.

Figure 7:
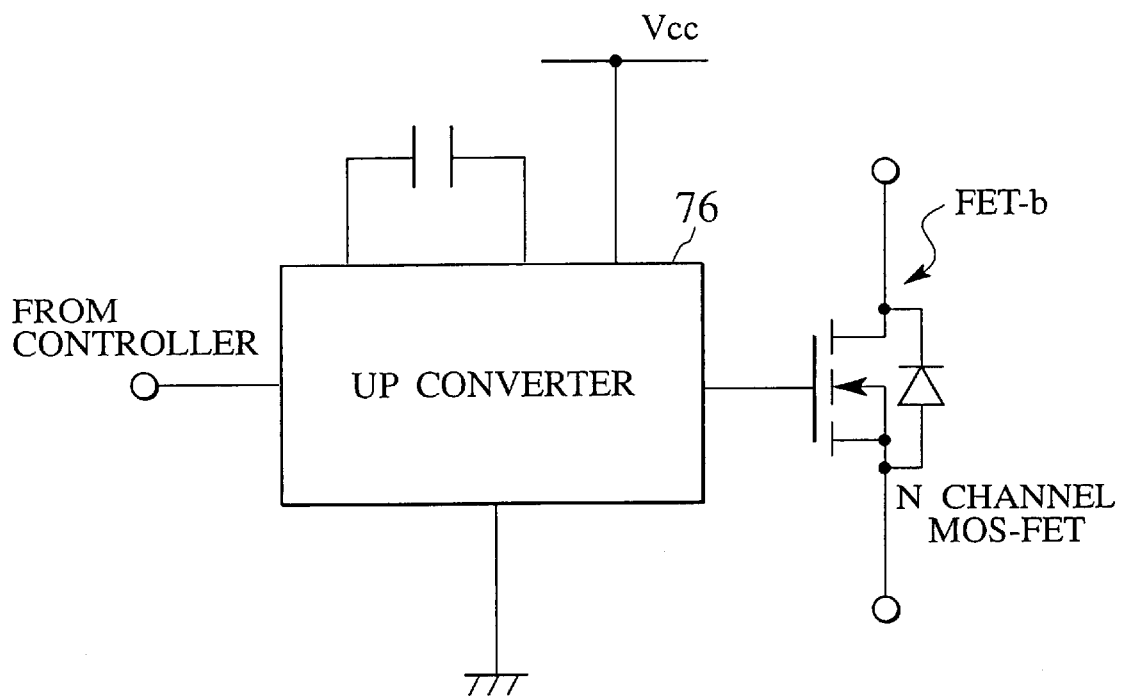
FIG. 7 is a figure showing an example of a circuit in a case in which an FET-b of the wiper control devices according to the first and the second embodiments of the present invention is formed by a P-channel type electric field effect transistor.

It should be noted that, in the first embodiment and the second embodiment which are described above, a P-channel type electric field effect transistor is used as the FET-b which controls the current supplied to the wiper motors 52 and 72. A N-channel type electric field effect transistor can be also used. In this case, as shown in FIG. 7, there is the need to make the voltage applied to the gate being higher than the power source voltage Vcc by using a presser means 76, and to sufficiently turn the FET-b on.

Figure 8:
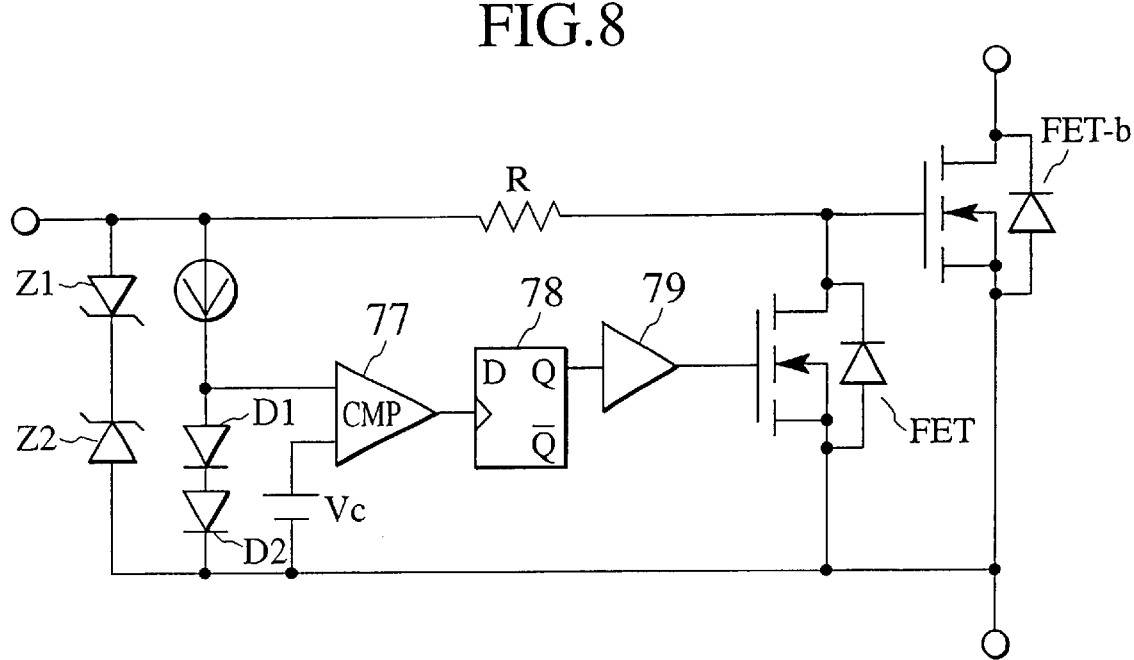
FIG. 8 is a figure showing an example of a circuit in a case in which an N-channel type electric field effect transistor of the wiper control devices according to the first and the second embodiments of the present invention is provided with an overheat cutoff function.

Moreover, each N-channel type electric field effect transistor can be structured so as to have an overheat preventing function. As shown in FIG. 8, the overheat preventing function can be realized by, for example, the Zener diodes Z1 and Z2, the diodes D1 and D2, the resistor R, a comparator 77, a D type flip-flop 78, an amplifier 79, and a transistor FET. Even if abnormally large current flows caused by a wiring short-circuit, in accordance with the condition of the short-circuit, the current flowing at the N-channel type electric field effect transistor FET-b can be cut off before the fuse operates. Thus, the reliability of the wiper control device can be improved.

Third Embodiment

Figure 9:
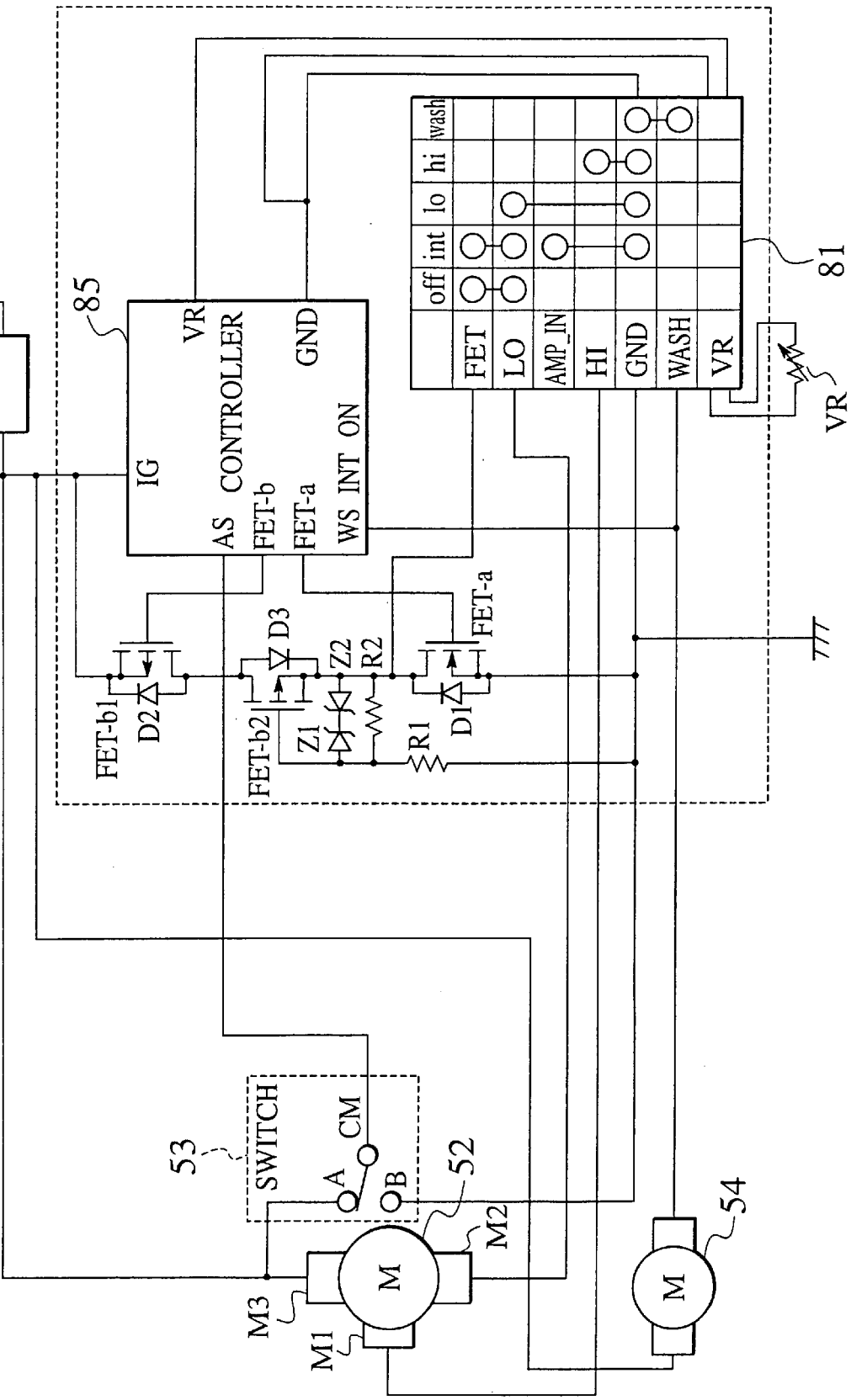
FIG. 9 is a block diagram showing the structure of a wiper control device according to a third embodiment of the present invention.

The wiper control device according to a third embodiment drives a two speed wiper motor by low side switch driving. The same reference numerals are applied to the same portions and corresponding portions of the wiper control devices relating to the first embodiment and the second embodiment. FIG. 9 is a block diagram showing the structure of the wiper control device relating to the third embodiment.

The FET-a corresponds to the first solid state switching element of the present invention, and is an N-channel type electric field effect transistor for driving the wiper motor. Further, a FET-b1 corresponds to the third solid state switching element of the present invention, and is a P-channel type electric field effect transistor for braking. A FET-b2 corresponds to the second solid state switching element of the present invention, and carries out the same operation as that of the FET-a2 of the wiper control device according to the first embodiment, which is for protection from surges at the time of reverse battery connection and motor locking. The gate of the FET-b2 is grounded via the voltage divider R1, R2. The switch 53 operates in response to movement of the wiper motor 52, and the input terminal A is in the park position.

The movement of the wiper control device relating to the third embodiment is substantially the same as that of the wiper control device according to the first embodiment which was described above, except that the current flowing at the downstream side (ground side) of the wiper motor 52 is controlled.

Figure 10:
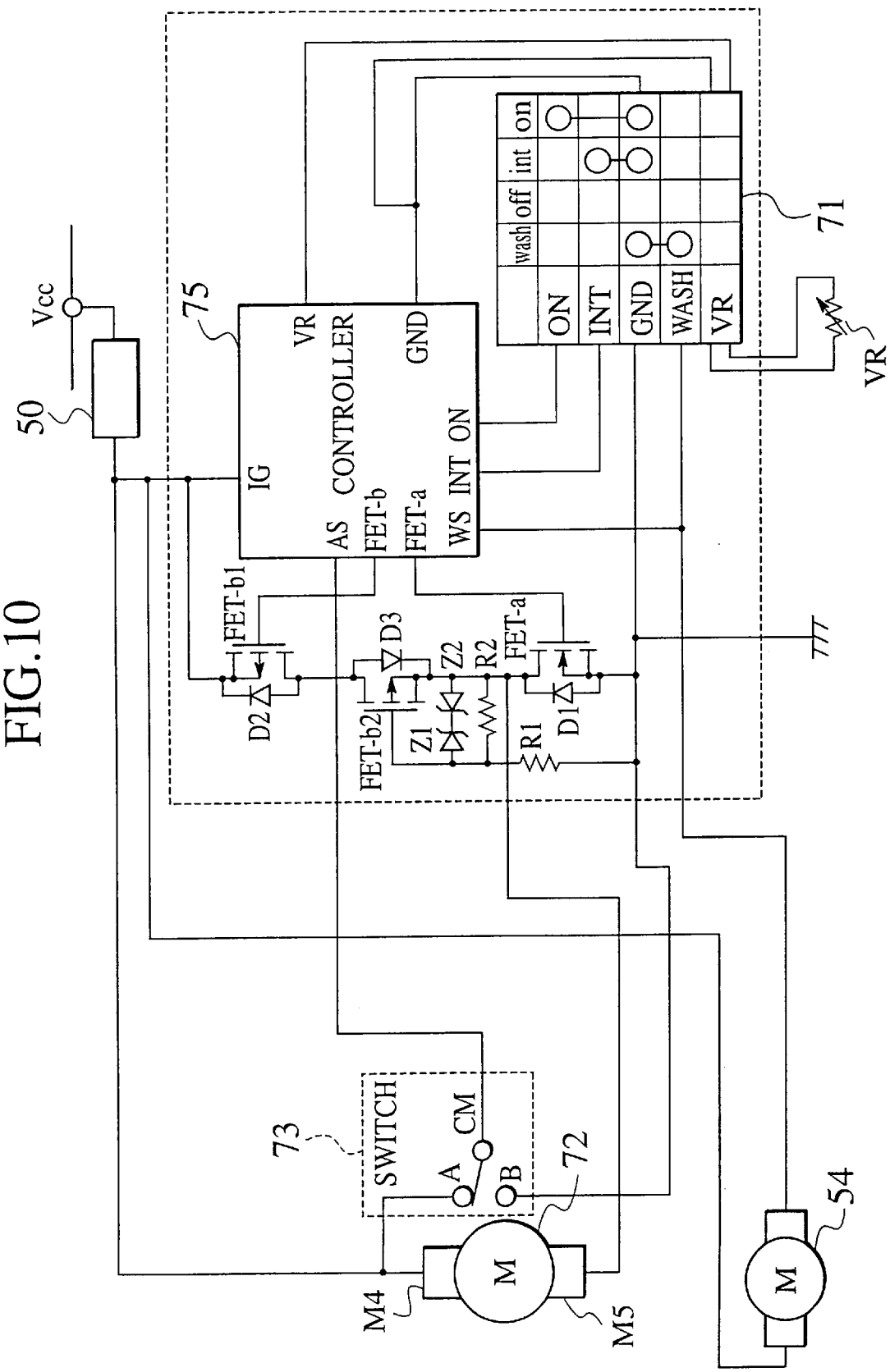
FIG. 10 is a block diagram showing the structure of a modified example of the wiper control device according to the third embodiment of the present invention.

It should be noted that, in the same way as in the second embodiment, a single speed wiper motor can be used as the wiper motor which is used in the third embodiment. Although detailed description thereof is omitted, the structure of the wiper control device in this case is shown in the block diagram of FIG. 10.

Fourth Embodiment

The wiper control device according to a fourth embodiment is a wiper control device in which an electric field effect transistor and a relay are combined together as a control element which controls the driving of the wiper motor.

Figure 11:
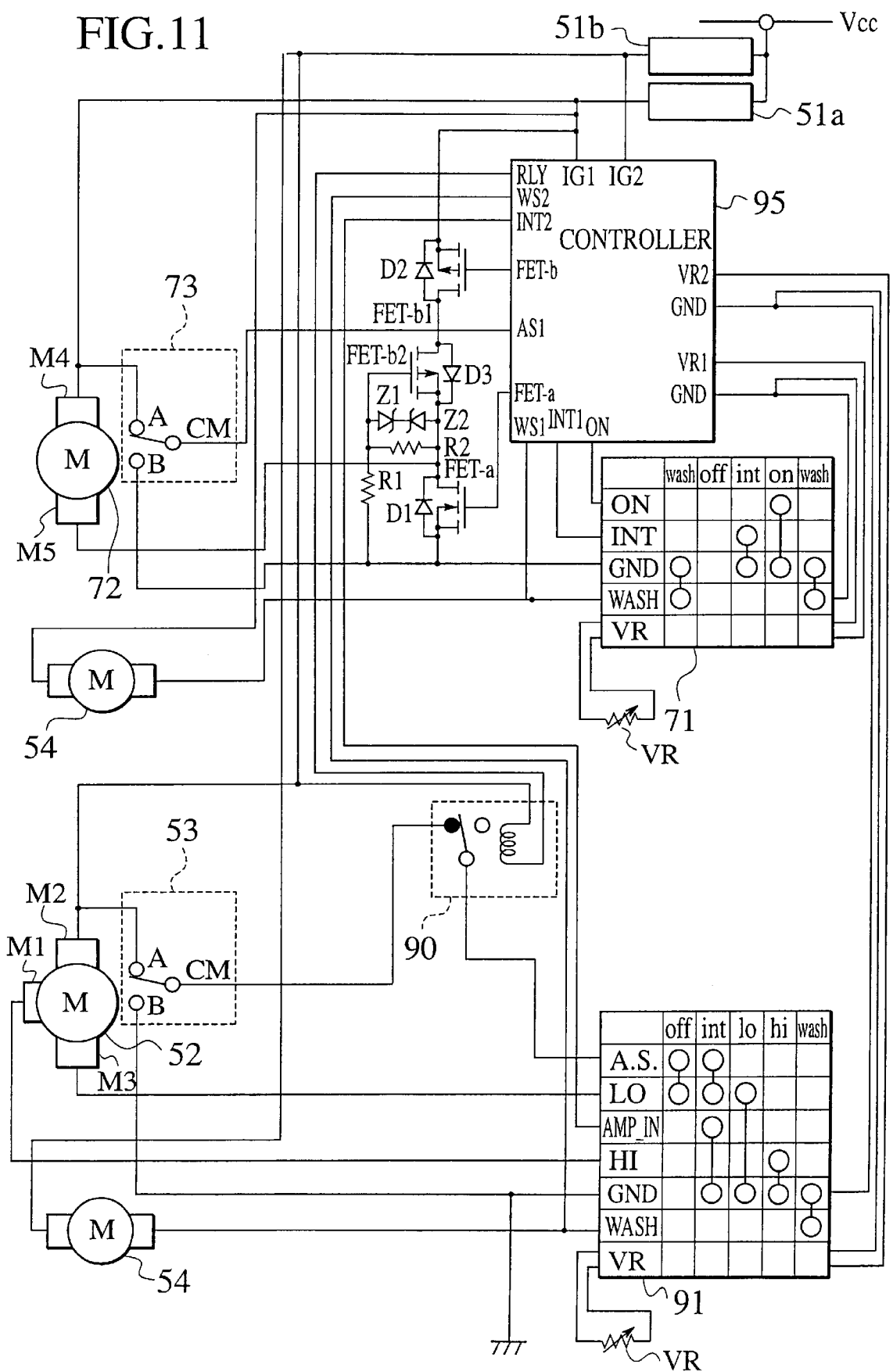
FIG. 11 is a block diagram showing the structure of a wiper control device according to the fourth embodiment of the present invention.

In a case in which a single vehicle comprises two wiper systems, the wiper control device relating to the present invention can be used in the first system, and a wiper control device, in which a relay is used and which is known art, can be used in the second system. FIG. 11 is a block diagram showing a structure of the wiper control device relating to the fourth embodiment.

In the fourth embodiment, the wiper control device according to the third embodiment is used as the wiper control section using an electric field effect transistor.

The wiper control section using a relay is formed by a relay 90, a second wiper switch circuit 91, a second wiper motor 52, a second switch 53, a second washer motor 54, and a second variable resistance VR. A controller 95 is structured so as to control both the wiper control section employing the electric field effect transistor, and the wiper control section employing the relay.

In accordance with the structure of the present embodiment, a wiper control device, which has a wiper control section using an electric field effect transistor and a wiper control section using a relay, can be realized. Thus, the range of applications is broadened.

According to the first aspect of the present invention, in a case in which intermittent wiper movement is instructed by the combination switch, the first solid state switching element is intermittently turned on and off on the basis of the signal from the switch which outputs a signal which inverts at each single sweep of the wiper, and the wiper motor which is for moving the wiper is driven. In this case, because the second solid state switching element is turned on by the power source voltage, the flow of the current at the time of the reverse battery connection can be prevented, and because surges at the time of motor locking can be absorbed, the reliability of the wiper control device can be improved.

According to the second aspect of the present invention, because only a small braking current at the time of motor stopping movement flows for a short time in the third solid state switching element, the third solid state switching element can be made compact and low-cost. Accordingly, the wiper control device can be made more compact and more low-cost. Moreover, because no diode is inserted into the third solid state switching element as in the conventional art, the braking efficiency is good, and the wiper control device can be made that much more compact.

According to the third aspect of the present invention, in a case in which abnormal voltage continues flowing due to motor locking, the signal from the switch is not switched for a predetermined time. Therefore, the controller detects this and cuts off the current, and protects the electric field effect transistor. As a result, there is no need to increase the current rating of the electric field effect transistor, and the wiper control device can be made more compact and lower cost.

According to the fourth aspect of the present invention, in addition to the intermittent wiper movement which was described above, high speed movement and low speed movement can be carried out. Thus, a wiper control device, which can carry out high-level wiper movement by using a wiper motor which has a high speed operation terminal and a low speed operation terminal, can be realized.

According to the fifth aspect of the present invention, a wiper motor, which carries out wiper movement at a predetermined speed in addition to the intermittent wiper movement which was described above, is used. Therefore, an inexpensive wiper control device can be realized.

According to the sixth aspect of the present invention, because the wiper control device can be formed with P-channel types and N-channel types being appropriately combined together as the first through the third solid state switching elements, the degrees of freedom in design increase.

According to the seventh aspect of the present invention, a wiper control device, which has a wiper control section using an electric field effect transistor and a wiper control section using a relay, is realized. Thus, the range of applications is broadened.

The present disclosure related to subject matter contained in Japanese Patent Application No. 2000-283155, filed on Sep. 19, 2000, the disclosure of which is expressly incorporated herein by reference in its entirety.

What is claimed is:

1. A wiper control device comprising:
   a wiper motor for moving a wiper;
   a switch for outputting a signal, the signal being inverted at each single sweep of the wiper;
   a combination switch for instructing movement of the wiper;
   a wiper motor for moving a wiper;
   a first solid state switching element for driving the wiper motor, the wiper motor being connected to one controlled terminal of the first solid state switching element;
   a controller for controlling the first solid state switching element; and
   a second solid state switching element being connected in series to the one controlled terminal of the first solid state switching element, the second solid state switching element being activated by a power source voltage, the power source voltage being applied to a controlled terminal of the second solid state switching element, wherein
   if intermittent wiper movement is instructed by the combination switch, the controller controls the first solid state switching element to an active state and an inactive state intermittently according to the signal from the switch.

2. The wiper control device of claim 1 further comprising:
   a third solid state switching element being connected in series to the second solid state switching element, wherein
   after making the first solid state switching element be inactive, the controller controls the third solid state switching element to active, and thereby a closed circuit for flowing reverse current to the wiper motor is formed.

3. The wiper control device of claim 1, wherein
   if the signal from the switch is not switched for a predetermined time, the controller makes the first solid state switching element be inactive.

4. The wiper control device of claim 1, wherein
   the wiper motor comprises a high speed operation terminal for rotating at high speed, and a low speed operation terminal for rotating at low speed;
   if high speed movement is instructed by the combination switch, the high speed operation terminal of the wiper motor is connected to the power source voltage and is operative; and
   if low speed movement is instructed by the combination switch, the low speed operation terminal of the wiper motor is connected to the power source voltage and is operative.

5. The wiper control device of claim 1, wherein
   the wiper motor comprises one power source terminal for rotating at predetermined speed, and
   if rotation movement is instructed by the combination switch, the power source terminal of the wiper motor is connected to the power source voltage and is operative.

6. The wiper control device of claim 1, wherein
   the first solid state switching element is provided between the wiper motor and a power source.

7. The wiper control device of claim 1, wherein
   the first solid state switching element is provided between the wiper motor and ground.

8. The wiper control device of claim 1, further comprising:
   a second wiper motor for moving a second wiper;
   a second switch, the second switch outputting a signal inverting at each single sweep of the second wiper;
   a second combination switch for instructing movement of the second wiper; and
   a relay for driving the second wiper motor, wherein
   the controller controls the relay in response to an instruction of the second combination switch, and drives the second wiper motor.

* * * * *